(12) United States Patent
Gilfix et al.

(10) Patent No.: US 7,117,204 B2
(45) Date of Patent: *Oct. 3, 2006

(54) TRANSPARENT CONTENT ADDRESSABLE DATA STORAGE AND COMPRESSION FOR A FILE SYSTEM

(75) Inventors: Michael Gilfix, Austin, TX (US); Anthony N. Liguori, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 427 days.

This patent is subject to a terminal disclaimer.

(21) Appl. No.: 10/728,169

(22) Filed: Dec. 3, 2003

(65) Prior Publication Data

US 2005/0125384 A1    Jun. 9, 2005

(51) Int. Cl.
*G06F 17/30* (2006.01)
*G06F 12/02* (2006.01)

(52) U.S. Cl. .................. 707/3; 707/101; 711/108
(58) Field of Classification Search ................ 711/113, 711/170–207, 108; 709/203; 710/68; 341/51; 707/3, 101
See application file for complete search history.

(56) References Cited

U.S. PATENT DOCUMENTS

| | | | | |
|---|---|---|---|---|
| 4,641,274 A | | 2/1987 | Swank | 715/531 |
| 5,179,378 A | * | 1/1993 | Ranganathan et al. | 341/51 |
| 5,247,646 A | * | 9/1993 | Osterlund et al. | 710/68 |
| 5,479,654 A | | 12/1995 | Squibb | 707/201 |
| 5,696,927 A | * | 12/1997 | MacDonald et al. | 711/207 |
| 5,721,907 A | | 2/1998 | Pyne | 707/201 |
| 5,832,520 A | | 11/1998 | Miller | 707/203 |
| 5,978,805 A | | 11/1999 | Carson | 707/204 |
| 6,061,714 A | * | 5/2000 | Housel et al. | 709/203 |
| 6,088,694 A | | 7/2000 | Burns et al. | 707/204 |
| 6,307,488 B1 | * | 10/2001 | Cooper | 341/51 |
| 6,311,187 B1 | | 10/2001 | Jeyaraman | 707/204 |
| 6,516,397 B1 | * | 2/2003 | Roy et al. | 711/170 |
| 6,535,894 B1 | | 3/2003 | Schmidt et al. | 707/204 |
| 6,968,424 B1 | * | 11/2005 | Danilak | 711/113 |
| 2001/0044910 A1 | | 11/2001 | Ricart et al. | |
| 2002/0120791 A1 | | 8/2002 | Somalwar et al. | |
| 2002/0163882 A1 | | 11/2002 | Bornstein et al. | |
| 2003/0078959 A1 | | 4/2003 | Yeung et al. | |
| 2005/0091234 A1 | * | 4/2005 | Hsu et al. | 707/100 |

* cited by examiner

*Primary Examiner*—Pierre Bataille
*Assistant Examiner*—Paul Schlie
(74) *Attorney, Agent, or Firm*—John R. Biggers; Herman Rodriguez; Biggers & Ohanian, LLP

(57) ABSTRACT

Transparent content addressable data storage and compression for a file system including providing a data structure that associates file identifiers and retrieval keys for memory blocks for storing file contents; storing in the data structure one or more file identifiers; providing a chunk of data comprising a quantity of input data of a file; retrieving a memory block from computer memory; searching for a segment of the chunk that matches the memory block; and if a matching segment is found: discarding the matching segment; providing a retrieval key for the memory block as a retrieval key for the matching segment; identifying an unmatched portion of the chunk that does not match the memory block; storing the unmatched portion; and providing a retrieval key for the unmatched portion.

21 Claims, 8 Drawing Sheets

TRANSPARENT CONTENT ADDRESSABLE DATA STORAGE AND COMPRESSION FOR A FILE SYSTEM

BACKGROUND OF THE INVENTION

1. Field of the Invention

The field of the invention is data processing, or, more specifically, methods, systems, and products for transparent content addressable data storage and compression for a file system.

2. Description of Related Art

Content addressable storage, sometime called associative storage, is a kind of computer memory storage in which items of data are stored by analysis of their content rather than by fixed memory addresses or locations. Traditional approaches to content addressable storage confront a dilemma: content addressable methods can be efficient in terms of CPU utilization if they use fixed memory block sizes, but using a fixed memory block size is an inefficient use of underlying storage media. Traditional methods of content addressable storage also typically do not provide for data compression, although, in terms of efficient use underlying storage media, it would be beneficial if they did. There is therefore an ongoing need for improvement in the area of content addressable storage.

Transparent file system compression schemes have been implemented in a number of ways in existing systems, including cramfs, ziosfs, and ntfs/vfat. These schemes compress data on a per-block basis, typically using industry standard compression techniques, zip, gzip, and so on, for example, and are limited to using small block sizes due to performance constraints. Because compression algorithms can only be as effective as the amount of entropy in their input, high compression ratios are less likely to be achieved when using smaller amount of input data.

SUMMARY OF THE INVENTION

Methods, systems, and products for transparent content addressable data storage and compression for a file system are presented that combine transparent compression with delta algorithms that allow for use of the entire contents of computer memory as a source of entropy for compression. The result of compression in systems according to the present invention is generally to increase entropy within the pool of data by reducing the amount of redundant data. More particularly, methods, systems, and products for transparent content addressable data storage and compression for a file system are presented that include providing a data structure that associates file identifiers and retrieval keys for memory blocks for storing file contents; storing in the data structure one or more file identifiers; providing a chunk of data comprising a quantity of input data of a file; and retrieving a memory block from computer memory; searching for a segment of the chunk that matches the memory block.

When a matching segment is found, typical embodiments include: discarding the matching segment; providing a retrieval key for the memory block as a retrieval key for the matching segment; storing in the data structure the retrieval key for the matching segment in association with a file identifier; identifying an unmatched portion of the chunk that does not match the memory block; storing the unmatched portion; providing a retrieval key for the unmatched portion; and storing in the data structure the retrieval key for the unmatched portion in association with the file identifier. Many embodiments include iteratively storing retrieval keys for each file until each file identifier is associated with only one retrieval key. Some embodiments include iteratively storing all file identifiers and associated retrieval keys until an entire file system is represented by a single retrieval key.

In typical embodiments, searching for a segment of the chunk that matches the memory block includes searching at a repeating memory interval through a search section of the chunk for a segment of the chunk that matches the memory block. In such embodiments, searching at a repeating memory interval through a search section of the chunk for a segment of the chunk that matches the memory block may be carried out by: calculating a weak checksum for the memory block; calculating weak checksums for segments of the search section of the chunk; comparing the weak checksums for the segments with the checksum for the memory block; and if a segment is found with a weak checksum equal to the weak checksum of the memory block: calculating a strong checksum for the memory block; calculating a strong checksum for the segment with the matching weak checksum; comparing the strong checksum of the memory block and the strong checksum for the segment with the equal weak checksum; and determining that the search has found a segment having contents that match the contents of the memory block if the strong checksum of the memory block and the strong checksum for the segment with the matching weak checksum are equal.

In typical embodiments, storing the unmatched portion of the chunk includes storing the unmatched portion of the chunk as a new memory block having a memory block size equal to the size of the unmatched portion of the chunk. When searching for a segment of the chunk that matches the memory block fails to find a matching segment, methods according to embodiments of the present invention often include repeatedly carrying out the following steps for all memory blocks in computer memory until a matching segment is found: retrieving a next memory block from computer memory and searching for a segment of the chunk that matches the next memory block. When no matching segment is found in any memory block in computer memory, methods according to embodiments of the present invention often include: storing a search section of the chunk; providing a retrieval key for the search section of the chunk; and storing the retrieval key for the search section in association with a file identifier. Typical embodiments also include reading file contents from computer memory for a file comprising an identifier and one or more associated retrieval keys, including: identifying memory blocks in dependence upon the associated retrieval keys and retrieving from memory the identified memory blocks.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for transparent content addressable data storage and compression for a file system. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Figure 1:
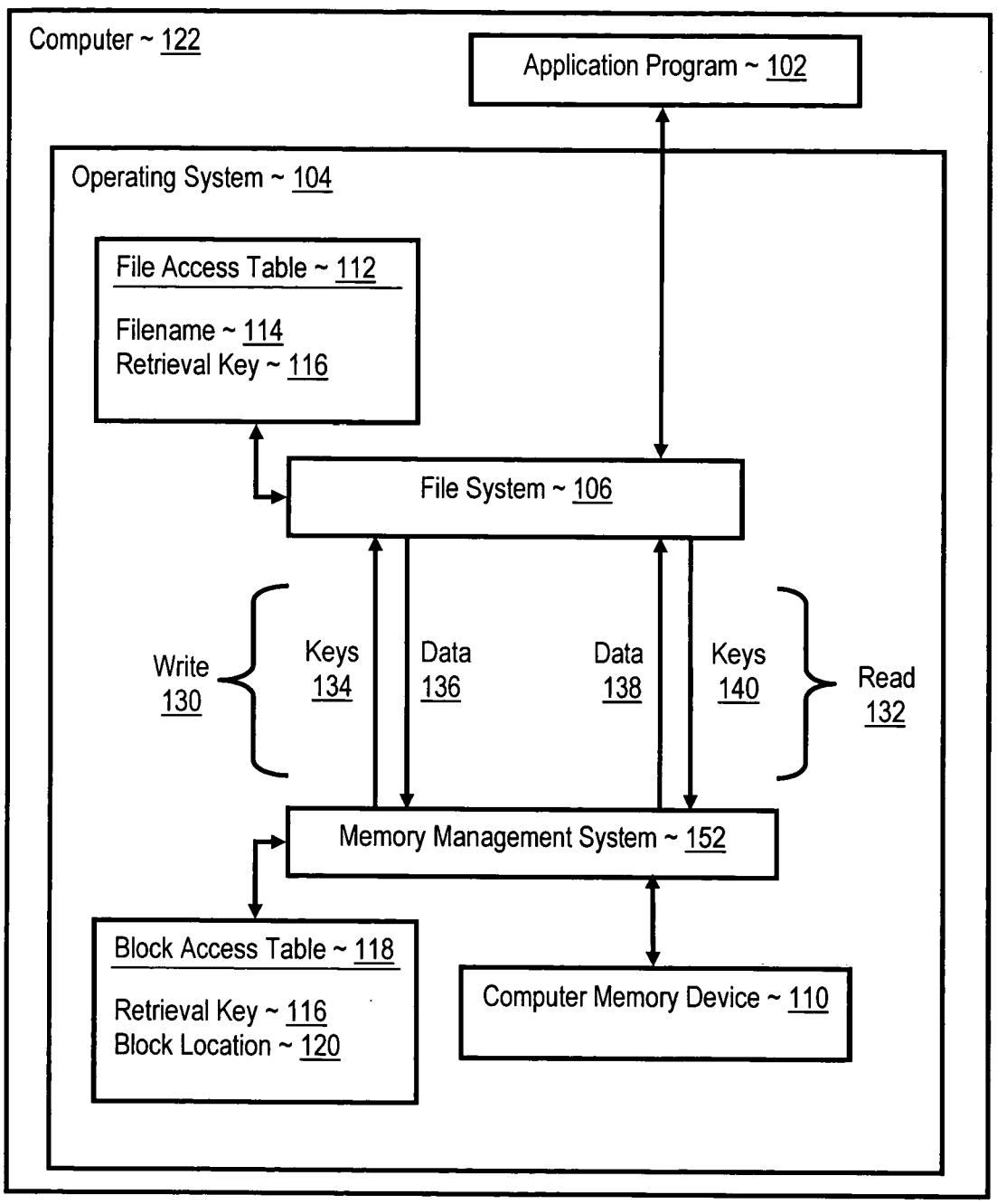
FIG. 1 sets forth a block diagram of an exemplary architecture in which may be implemented transparent content addressable data storage and compression for a file system according to embodiments of the present invention.

Transparent Content Addressable Data Storage and Compression for a File System Methods, systems, and products for transparent content addressable data storage and compression for a file system are explained with reference to the accompanying drawings, beginning with FIG. 1. FIG. 1 sets forth a block diagram of an exemplary architecture in which may be implemented transparent content addressable data storage and compression for a file system according to embodiments of the present invention. The architecture of FIG. 1, includes file system (106) and a memory management system (152). In the example of FIG. 1, files system (106) tracks retrieval keys (116) by filename (114) in file access table (112), so that the file system can accept retrieval keys (134) as returns from memory write operations (130) and can provide retrieval keys (140) as input parameters for memory read operations (132).

Memory management system (152) is a combination of computer hardware and software that implements methods for transparent content addressable data storage and compression for a file system according to embodiments of the present invention. In many embodiments, a memory management system (152) according to an embodiment of the present invention is implemented as a device driver (108) for a memory device (110) such as a magnetic disk drive or read/write optical drive. Memory management system (152) operates to write (130) data to computer memory and to read (132) data from computer memory. In writing (130) data to computer memory, memory management system (152) receives data (136) typically through an input stream and returns to its writing file system (106) retrieval keys (134) that the file system can later use to read the written data back from memory. In reading (132) data from computer memory, memory management system (152) receives from a file system (106) a stream of retrieval keys (140) and returns to the file system data (138) previously written to memory.

In the example of FIG. 1, memory management system (152) uses computer memory device (110) for actual data storage. Computer memory device (110) is implemented as any form of computer memory that can be both written and read, including, for example, random access memory, electrically erasable programmable read only memory ('EEPROM' or 'flash memory'), read/write optical memory, magnetic disk drives, and so on as will occur to those of skill in the art. To track the actual location in memory of memory blocks associated with retrieval keys, memory management system (152) maintains block access table (118) relating retrieval keys (116) and memory block locations (120).

Figure 2:
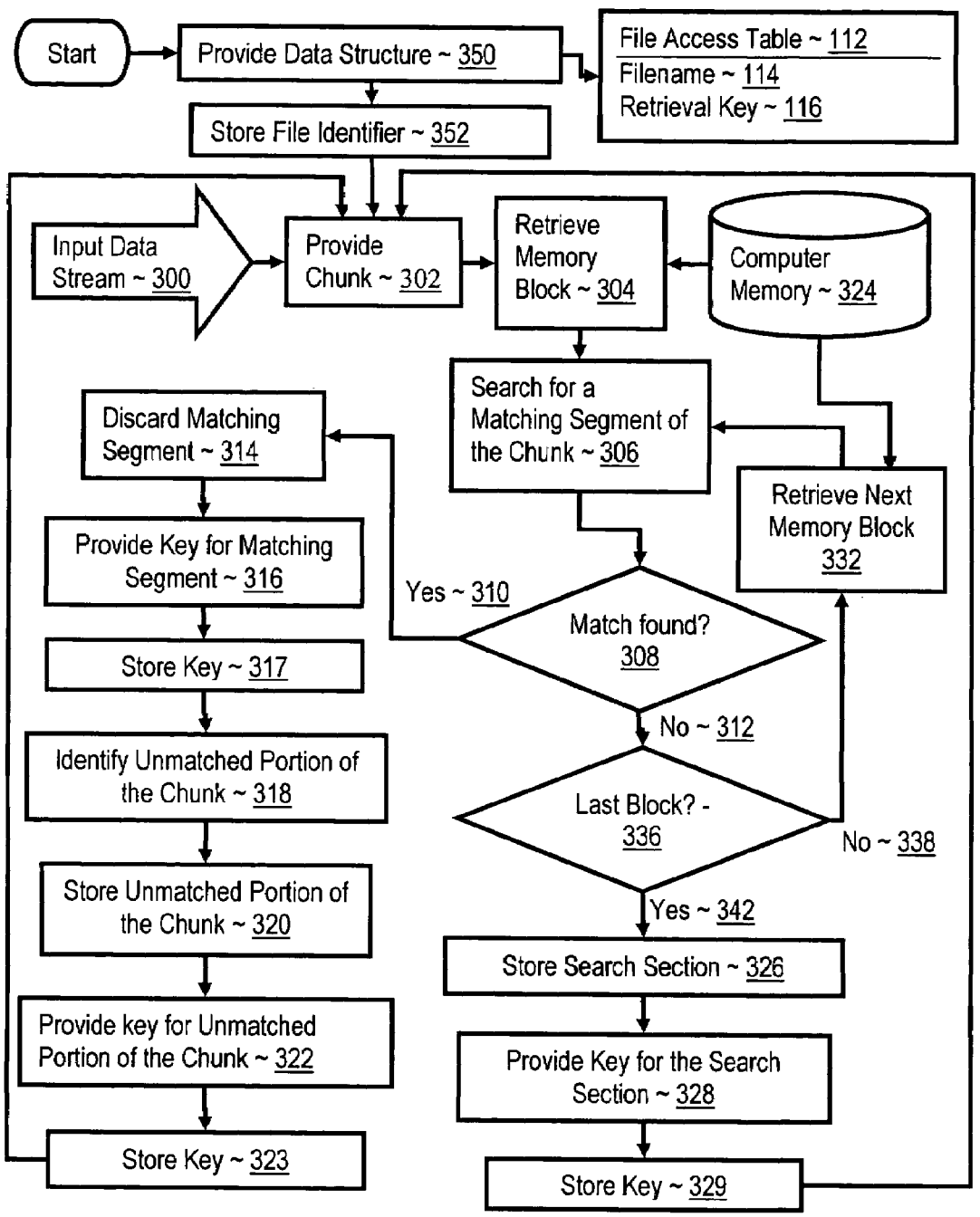
FIG. 2 sets forth a flow chart illustrating an exemplary method of transparent content addressable data storage and compression for a file system.

FIG. 2 sets forth a flow chart illustrating an exemplary method of transparent content addressable data storage and compression for a file system that includes providing (350) a data structure (112) that associates file identifiers (114) and retrieval keys (116) for memory blocks for storing file contents and storing (352) in the data structure (112) one or more file identifiers (114). An example of such a data structure is file access table (112) on FIG. 2 which provides data elements for storing file identifiers as filenames (114) as well as retrieval keys (116).

The method of FIG. 2 also includes providing (302) a chunk of data comprising a quantity of input data of a file. Computer memory (324) and the method of FIG. 2, in providing content addressable data storage and compression, are configured to operate with a maximum memory block size for data to be compressed and stored in computer memory. A "chunk" is an input quantity of memory to be processed for storage and compression by searching it for matching memory segments according to embodiments of the present invention. In order to support searching through a chunk for a matching segment that is the same size as a memory block under comparison, a chunk in the method of FIG. 2 advantageously has a chunk size that is larger than the maximum block size.

At startup, providing (302) a chunk generally is carried out by retrieving from input a quantity of input data for storage and compression having a chunk size larger than the maximum memory block size. In many embodiments, providing (302) a chunk at startup may include retrieving from input a quantity of input data for storage and compression having a predetermined minimum chunk size larger than the maximum memory block size. In some exemplary embodiments of the method of FIG. 2, a predetermined minimum chunk size is set to twice the maximum memory block size, advantageously supporting searches of chunks for memory blocks of the maximum size so that no more than one match may occur during each search loop. In addition to startup processing, there are circumstances in the method of FIG. 2, discussed in more detail below, in which providing a chunk is carried out by retrieving from input a quantity of data of any size less than a predetermined maximum, including for example, after storing a key for an unmatched portion of a chunk (323) and after storing a key for a search section (329).

The method of FIG. 2 includes retrieving (304) a memory block from computer memory (324) and searching (306) for a segment of the chunk that matches the memory block. In the method of FIG. 2, retrieving (304) a memory block from computer memory (324) is carried out by retrieving from computer memory a memory block having a memory block size no greater than a maximum memory block size. That is, a retrieved memory block in this example may have any memory block size not larger than a maximum memory block size as predetermined for any particular embodiment.

In the example of FIG. 2, searching (306) for a segment of a chunk that matches a memory block includes searching at a repeating memory interval through a search section of the chunk for a segment of the chunk that matches the memory block. In many embodiments, the memory interval is set to one bit, although that is not a limitation of the invention. In other embodiments, the repeating memory interval for search may be set to any useful memory interval as will occur to those of skill in the art, two bits, one nibble, one byte, one memory word, a double word, and so on.

Figure 5:
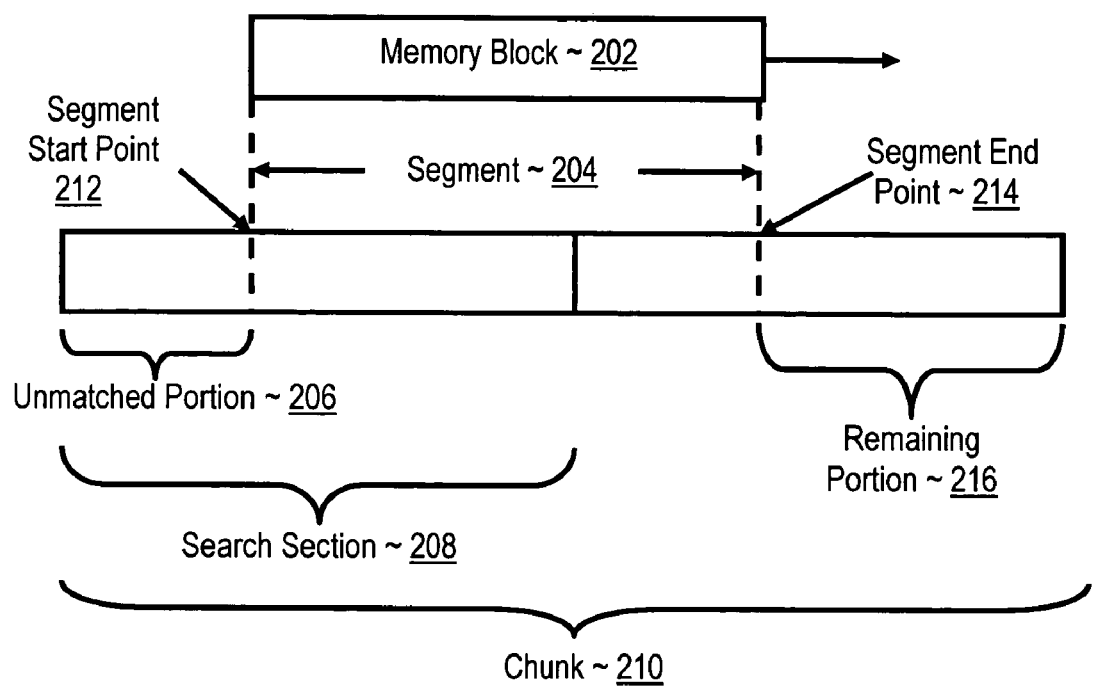
FIG. 5 sets forth a line drawing illustrating an exemplary search for a segment of a chunk that matches a memory block.

Searching (306) for a segment of a chunk that matches a memory block is explained further with reference to FIG. 5. FIG. 5 sets forth a line drawing illustrating an exemplary search for a segment of a chunk that matches a memory block. In the example of FIG. 5, memory block (202) has been retrieved and a search for a matching segment (204) of chunk (210) is carried out by beginning at the beginning at the first segment of the chunk and comparing the memory block with each segment having a segment start point inside the search section (208) of the chunk.

In this example, the chunk size is one kilobyte, 1024 bytes, the maximum memory block size for the embodiment is set to 512 byes, the memory block under comparison is assumed to have a memory block size of the maximum, 512 bytes, and the repeating memory interval for the search is set to one bit. The bits in the chunk are numbered from 1 through 1024*8=8192. Each segment to be compared with the memory block in this exemplary search then is 4096 bits in size, and the segments to be compared overlay one another beginning with a first segment whose segment start point is at chunk bit 1 and whose segment end point is at chunk bit 4096. A second segment has a segment start point at chunk bit 2 and a segment end point at chunk bit 4097. A third segment has a segment start point at chunk bit 3 and a segment end point at chunk bit 4098. And so on, through the last segment in the search section (208) of the chunk whose segment start point at chunk bit 4096 and a segment end point at chunk bit 8191.

Figure 6:
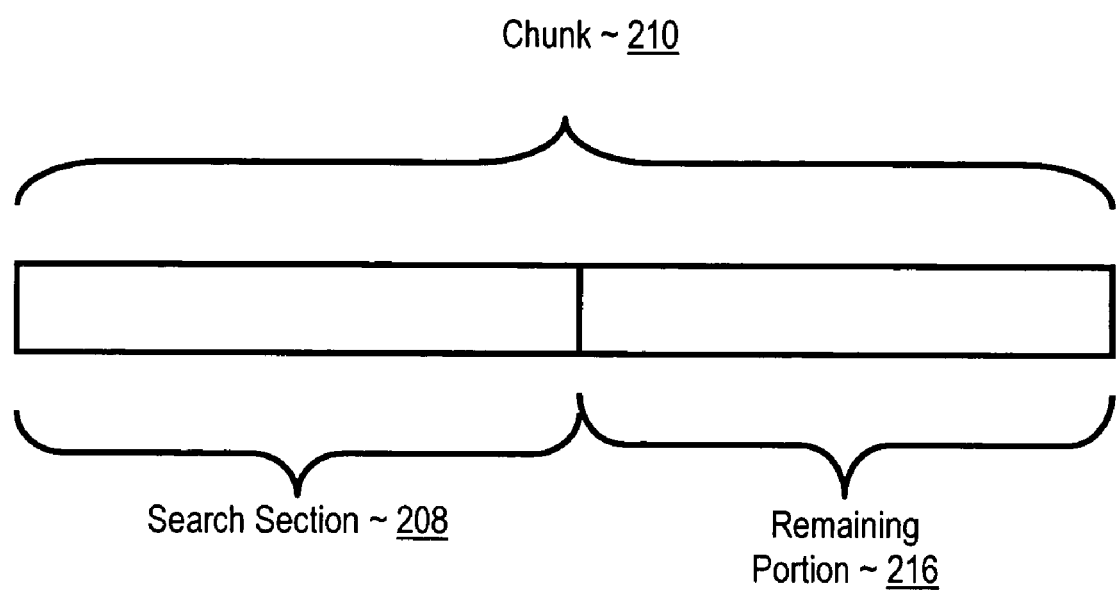
FIG. 6 sets forth a line drawing illustrating an exemplary search for a segment of a chunk that matches a memory block on the assumption that in searching through the chunk, no matching segment was found.

The use of a search section (208) is explained further with reference to FIG. 6. FIG. 6 sets forth a line drawing illustrating an exemplary search for a segment of a chunk that matches a memory block on the assumption that in searching through chunk (210), no matching segment was found. This search was similar to the search of FIG. 5, a one-kilobyte chunk with a 512 byte memory block for comparison. In this example, where no match was found, the entire search section (208) is broken off from the chunk, keyed, and then stored in memory as a new memory block. The segment (216) with a segment start point at chunk bit 4097 and a segment end point at chunk bit 8192, now taken as the "remaining portion," if no matching segment is found in the chunk under comparison, is also taken as the first segment in a next search section for a next chunk—where in that next chunk the segment will be deemed to have a segment start point at chunk bit 1 and a segment end point at chunk bit 4096.

In the example of FIG. 5, if it is assumed that a search has resulted in finding a matching segment (204), having segment start point (212) at chunk bit 800 and a segment end point (214) at chunk bit 4896, then the portion of the chunk from bit 1 through bit 799 is an unmatched portion (206) of the chunk to be keyed and stored in memory in a new memory block. The matched segment (204) is to be keyed with the same key as the memory block (202) it matches and then discarded, because a memory block (202) matching the segment (204) is already stored in memory. The remaining portion (216) of the chunk, that is, the portion remaining after the unmatched portion is stored and the matched segment is discarded, is used to form the beginning of a next chunk for comparison, as described in more detail below.

Figure 7:
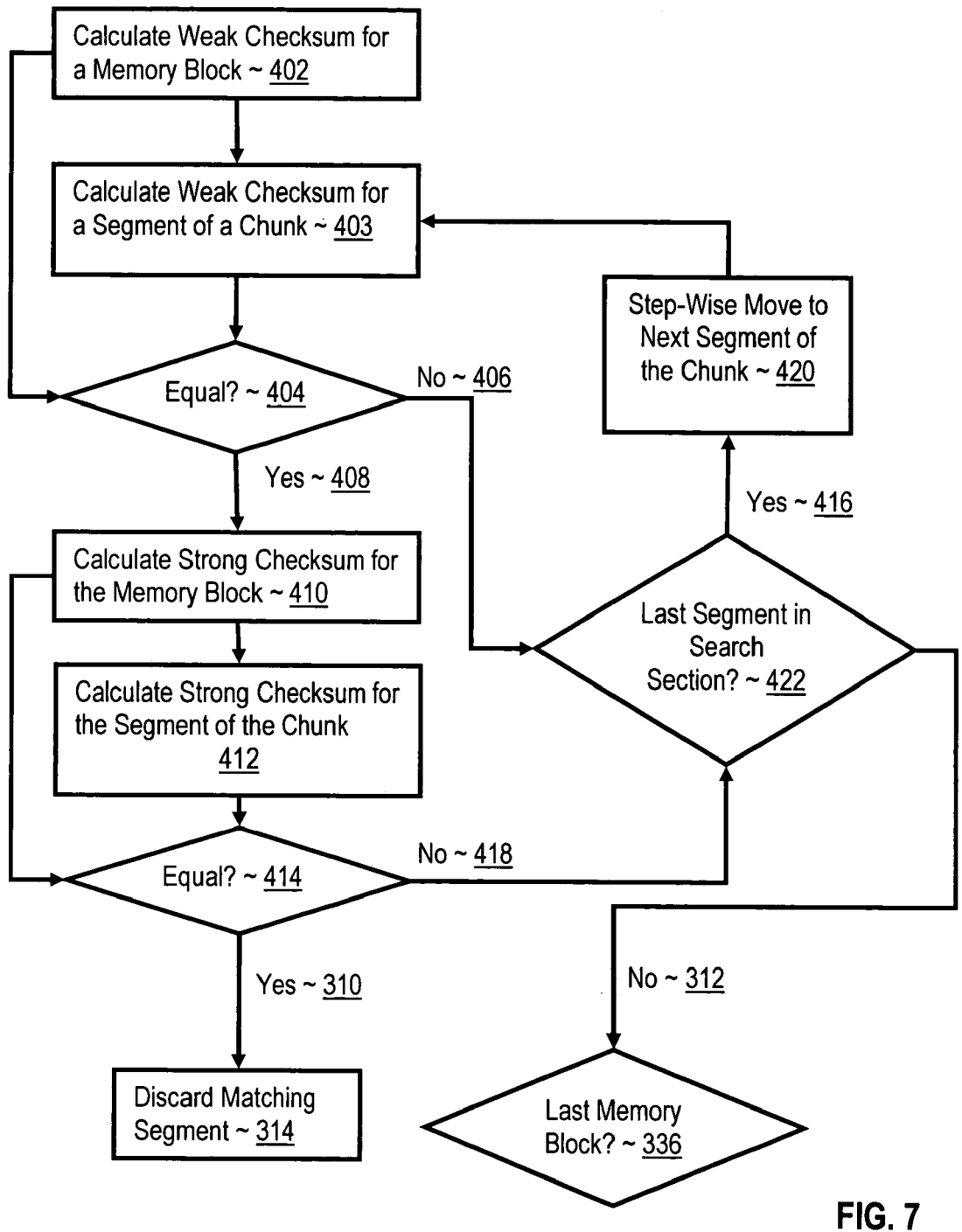
FIG. 7 sets forth a flow chart that illustrates an exemplary method of searching at a repeating memory interval through a search section of a chunk for a segment of the chunk that matches a memory block.

Searching (306) for a segment of a chunk that matches a memory block is explained further with reference to FIG. 7. FIG. 7 sets forth a flow chart that illustrates an exemplary method of searching at a repeating memory interval through a search section of the chunk for a segment of the chunk that matches a memory block. The method of FIG. 7 includes calculating (402) a weak checksum for the memory block. A weak checksum may be implemented as any function having a relatively low computational overhead. Lossy linear functions such as the Adler-32 checksum from RFC 2960 and RFC 1950 are useful as weak checksums. Another example of a useful weak checksum is a simple sum of the values of the bits in a memory block.

The method of FIG. 7 also includes calculating (403) weak checksums for segments of the search section of the chunk. Because calculating weak checksums for segments of the search section is often carried out by calculating weak checksums for a series of adjacent, overlapping segments, calculating (403) weak checksums for segments of the search section of the chunk is often carried out by calculating rolling weak checksums. Consider an example of a weak checksum calculated as a rolling sum of the values of the bits in a segment. Assume that the memory block size is 512 bytes and that the segment size for segments in a chunk is also therefore 512 bytes. Calculating a rolling weak checksum then is carried out by summing the values of bits 1–4096 for the first segment in the search section of the chunk to establish a rolling weak checksum. Then the weak checksum for the second segment is calculated by subtracting from the rolling weak checksum the value of bit 1 and adding the value of bit 4097. The weak checksum for the third segment is calculated by subtracting from the rolling weak checksum the value of bit 2 and adding the value of bit 4098. The weak checksum for the fourth segment is calculated by subtracting from the rolling weak checksum the value of bit 3 and adding the value of bit 4099, continuing until a match is found or for all the segments in the search section of a chunk if no match is found.

The method of FIG. 7 also includes comparing (404) the weak checksums for the segments with the checksum for the memory block. When a segment's weak checksum is found not equal to the weak checksum of the memory block (406), processing continues in the method of FIG. 7 by determining (422) whether there are more segments in the chunk to be compared with the current memory block, and, if so (416), moving (420) to the next segment, calculating a weak checksum for the next segment (403), comparing (404) that weak checksum with the weak checksum for the memory block, and so on.

Weak checksums do not uniquely identify a chunk segment or a memory block, and a positive comparison therefore identifies a probable match between a memory block and a segment of a chunk but does not conclusively determine a match. Weak checksums are used to exclude non-matching segments with small computational overhead. When a candidate segment is found with a matching weak checksum, however, a stronger calculation is needed to determine whether a true match exists. If a segment is found with a weak checksum equal to the weak checksum of the memory block (408), therefore, the method of FIG. 7 includes calculating (410) a strong checksum for the memory block. A strong checksum is a function that when applied to the contents of a memory block or chunk segment yields a result that is unique to a high degree of probability. Examples of strong checksums include one-way hashing functions such as SHA and MD5. SHA is the 'Secure Hash Algorithm,' an algorithm designed for use with the Digital Signature Standard (DSS), a cryptographic standard of National Institute of Standards and Technology (NIST) and the National Security Agency (NSA). MD5 is the Messaging Digest algorithm number 5, developed by Ronald Rivest and promulgated as a standard in RFC 1321 from the Internet Engineering Task Force. These examples are for explanation, not for limitation. In fact, it is well within the scope of the present invention to use any strong checksum function as will occur to those of skill in the art.

The method of FIG. 7 also includes calculating (412) a strong checksum for the segment with the matching weak checksum and comparing (414) the strong checksum of the memory block and the strong checksum for the segment with the equal weak checksum. Because many such comparisons will typically be calculated in a loop, in many embodiments, calculating (410) a strong checksum for the memory block comprises calculating a static strong checksum for the memory block, thereby calculating the strong checksum for the memory block only once even if a looping series of comparisons produces multiple candidates with equal weak checksums for comparison.

The method of FIG. 7 includes determining (310) that the search has found a segment having contents that match the contents of the memory block if the strong checksum of the memory block and the strong checksum for the segment with the matching weak checksum are equal. When such a match is found, processing continues in this example with discarding the matching segment (314), providing a key for the matching segment (316), storing (317) the retrieval key for the matching segment in association with a file identifier, and so on, according to the exemplary method of FIG. 2. If in comparing (414) the strong checksum of the memory block and the strong checksum for the segment with the equal weak checksum no match is found (418), processing continues in the method of FIG. 7 by determining (422) whether there are more segments in the chunk to be compared with the current memory block, and, if so (416), moving (420) to the next segment, calculating a weak checksum for the next segment (403), comparing (404) that weak checksum with the weak checksum for the memory block, and so on.

Finding no match (418) in comparing (414) the strong checksum of the memory block and the strong checksum for the segment with the equal weak checksum when there are no more segments in the chunk to be compared with the current memory block (312) is taken as a determination of no matching segment in the chunk for the memory block under comparison. In this circumstance processing continues, in the method of FIG. 2, for example, with determining (336) whether there are more memory blocks to be retrieved from memory and compared with segments of the chunk, and so on, as discussed below in more detail.

In the method of FIG. 2, if, in searching (306) for a segment of a chunk that matches a memory block, a matching segment is found (310), the method includes discarding (314) the matching segment, providing (316) a retrieval key for the memory block as a retrieval key for the matching segment, and storing (317) in a data structure (112) the retrieval key for the matching segment in association with a file identifier. It is useful to discard the matching segment because the fact that it matches the memory block under comparison means that one instance of the matching segment is already stored in memory and already has a retrieval key associated with it. The method advantageously includes providing (316) a retrieval key for the memory block as a retrieval key for the matching segment because the matching segment and the memory block are identical. In fact, this is a useful example of memory compression achieved by storing these identical contents only once. Any memory client wishing to retrieve those contents is provided the same key regardless of where in any data stream, data structure, chunk, or other aggregation of computer data those contents occur.

When a matching segment is found, the method of FIG. 2 includes identifying (318) an unmatched portion of the chunk that does not match the memory block, storing (320) the unmatched portion, providing (322) a retrieval key for the unmatched portion, and storing (329) in the data structure (112) the retrieval key for the unmatched portion in association with a file identifier. In fact, by comparison with matched segments which are discarded without being stored in memory, this unmatched portion of a chunk is a portion of an input data stream that is stored in memory. The method of FIG. 2 implements variable memory block size by storing the unmatched portion of the chunk as a new memory block having a memory block size equal to the size of the unmatched portion of the chunk. The memory block size varies because the size of an unmatched portion of a chunk varies from match to match.

In the method of FIG. 2, providing (322) a retrieval key for the unmatched portion of a chunk may be carried out by calculating a weak checksum for the unmatched portion of the chunk, calculating a strong checksum for the unmatched portion of the chunk, and using a combination of the two checksums as a retrieval key. Using a key derived from memory contents as a retrieval key advantageously makes it possible to verify memory contents by use of such a key.

Processing components of a chunk when a match is found is explained with reference to FIG. 2 and FIG. 5. In the method of FIG. 2, when processing continues after finding a matching segment (310) and providing a key for an unmatched portion of a chunk (322), providing (302) a chunk, that is, a next chunk for continued processing, may be carried out by retrieving from input a quantity of data equal in size to the sum of the sizes of the matching segment (204 on FIG. 5) and the unmatched portion (206) and concatenating the retrieved input quantity to a remaining portion (216) of the chunk that remains after discarding the matching segment (204) and storing the unmatched portion (206).

Processing components of a chunk in the method of FIG. 2 when no match is found is explained with reference to FIG. 2 and FIG. 6. In the method of FIG. 2, when searching (306) for a segment of the chunk that matches the memory block fails to find a matching segment (312), the method includes repeatedly carrying out the following steps for all memory blocks in computer memory until a matching segment is found (310): retrieving (332) a next memory block from computer memory (324) and searching (306) for a segment of the chunk that matches the next memory block. If no matching segment is found in any memory block in computer memory (342), the method of FIG. 2 includes storing (326) a search section (208 on FIG. 6) of the chunk (210), providing (328) a retrieval key for the search section of the chunk, and storing (329) the retrieval key for the search section in association with a file identifier. In the method of FIG. 2, storing (326) the search section (208 on FIG. 6) of the chunk (210) is typically carried out by storing the search section of the chunk as a new memory block having a memory block size equal to the size of the search section of the chunk.

In the method of FIG. 2, providing (328) a retrieval key for a search section of a chunk typically includes calculating a weak checksum for the search section of the chunk and calculating a strong checksum for the search section of the chunk. When no match is found (312) and there are no further memory blocks for comparison (342), providing (302) a chunk, that is, providing a next chunk for further processing of an input stream, may be carried out by retrieving from input a quantity of data equal in size to the search section (208) concatenating the retrieved input quantity to the remaining portion (216) of the chunk that remains after storing the search section.

Figure 3:
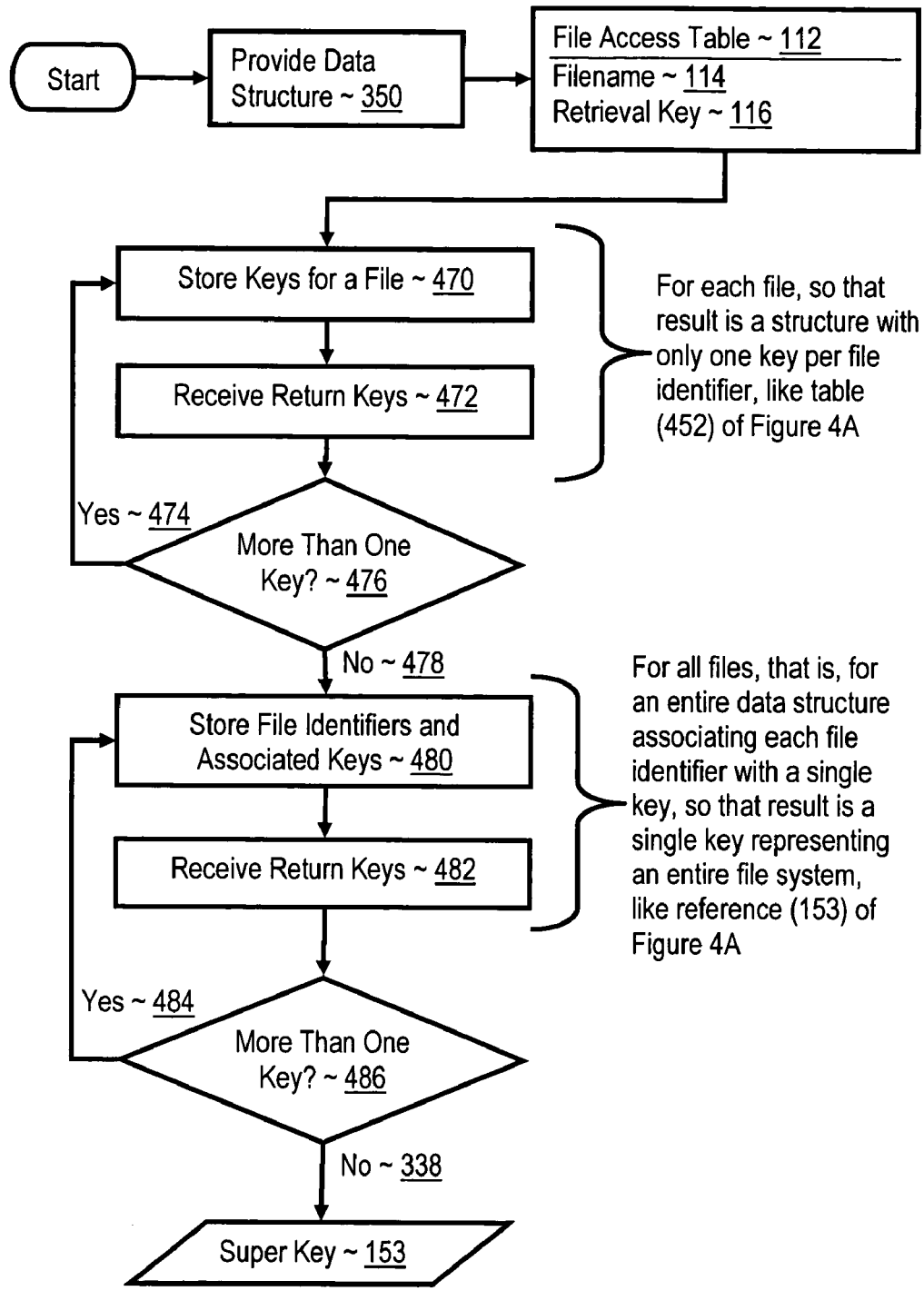
FIG. 3 sets forth a flow chart illustrating a method of iteratively storing retrieval keys for each file until each file identifier is associated with only one retrieval key.

Methods of transparent content addressable data storage and compression for a file system according to embodiments of the present invention may also include iteratively storing retrieval keys for each file until each file identifier is associated with only one retrieval key. FIG. 3 sets forth a flow chart illustrating a method of iteratively storing retrieval keys for each file until each file identifier is associated with only one retrieval key. The method of FIG. 3 includes storing (470) keys for a file as data in computer memory using a transparent content addressable data storage and compression system according to an embodiment of the present invention. The method of FIG. 3 includes receiving (472) return keys for the file's retrieval keys.

That is, the retrieval keys for a file are presented to a memory management system according to an embodiment of the present invention as data to be compressed and stored. The memory management system returns one or more retrieval keys identifying memory blocks in which the files retrieval keys are now stored. This process iterates (474) until all the keys for a file have been stored and the keys for the keys have been stored and so on until a single retrieval key (478) represents the entire file. Then the whole process iterates for the next file and the next file until each file in a file system is represented by a single retrieval key.

Figure 4:
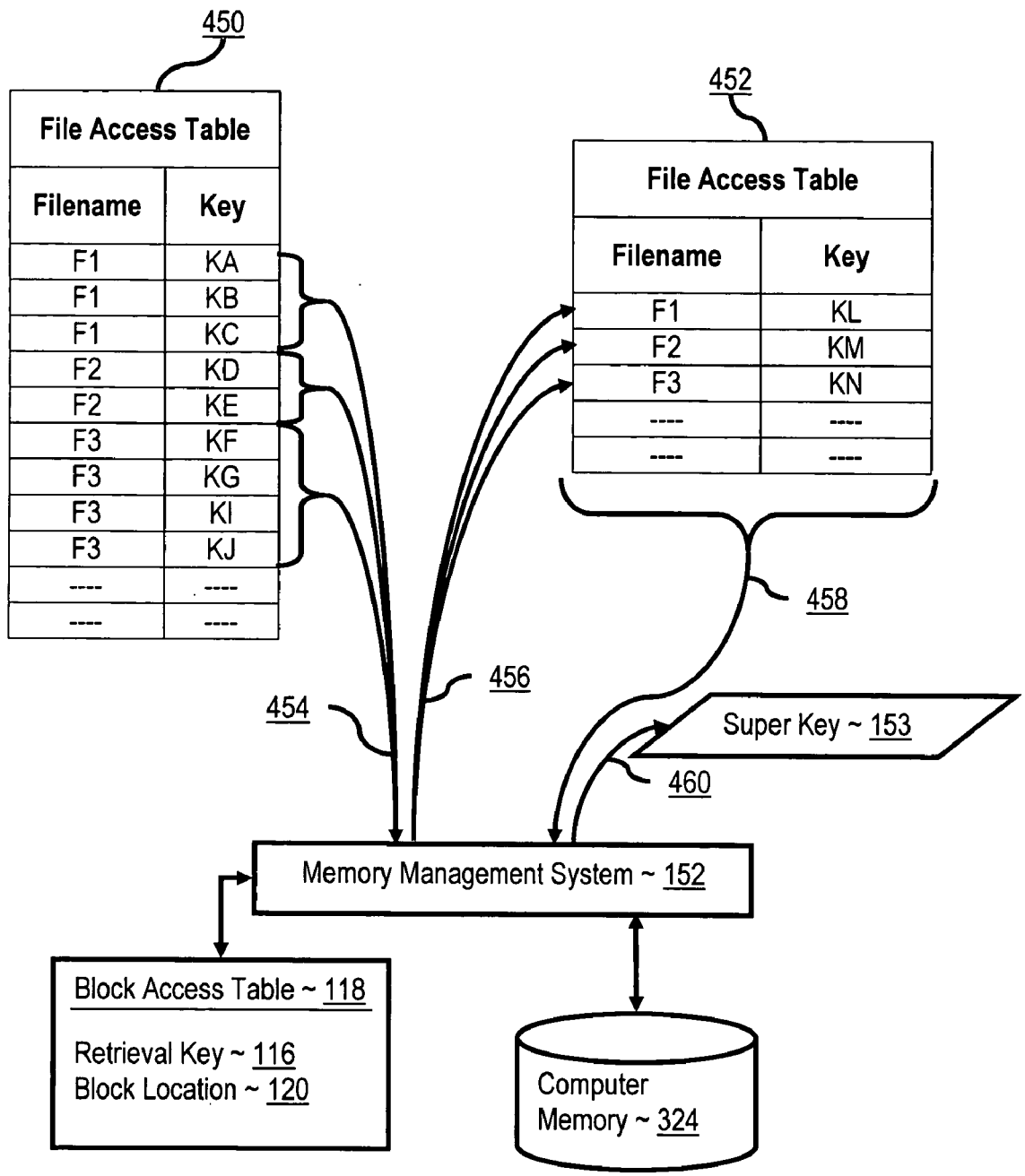
FIG. 4 sets forth a data flow diagram illustrating an exemplary method of iteratively storing retrieval keys for each file until each file identifier is associated with only one retrieval key.

FIG. 4 sets forth a data flow diagram illustrating an exemplary method of iteratively storing retrieval keys for each file until each file identifier is associated with only one retrieval key. In the example of FIG. 4, file access table (450) represents a data structure that associates file identifiers, shown as filenames, and retrieval keys for memory blocks for storing file contents. Examplary table (450) contains retrieval keys KA, KB, and KC for a file named F1, retrieval keys KD, KE for a file named F2, and retrieval keys KF, KG, KI, and KJ for a file named F3. In this example, the retrieval keys from table (450) are written (454) for each file in turn to computer memory (324) through memory management system (152), a transparent content addressable data storage and compression system according to the present invention. Memory management system (152) stores the keys as data in memory blocks tracked through block access table (118), returning (456) retrieval keys for the retrieval keys, in effect, and this process iterates until each file may be associated with only a single retrieval key as show in file access table (452), where file F1 is now associated with only one key, KL, file F2 with only key KM, and file F3 with only key KN.

Methods of transparent content addressable data storage and compression for a file system according to embodiments of the present invention may also include iteratively storing all file identifiers and associated retrieval keys until an entire file system is represented by a single retrieval key. FIG. 3 illustrates a method of iteratively storing file identifiers and associated retrieval keys until an entire file system is represented by a single retrieval key. The method of FIG. 3 includes storing (480) all file identifiers and associated keys for all files in a file system. The method of FIG. 3 includes receiving (482) return keys for the file system's file identifiers and retrieval keys. That is, the file identifiers and retrieval keys for a file system are presented to a memory management system according to an embodiment of the present invention as data to be compressed and stored. The memory management system returns one or more retrieval keys identifying memory blocks in which the file identifiers and retrieval keys are now stored. This process iterates (484) until all the file identifiers and keys for a file system have been stored and the keys for the keys have been stored and so on until a single retrieval key (478) represents the entire file system (338, 153).

FIG. 4 sets forth a data flow diagram illustrating an exemplary method of iteratively storing all file identifiers and associated retrieval keys until an entire file system is represented by a single retrieval key. In the example of FIG. 4, file access table (452) represents a data structure that associates file identifiers, shown as filenames, and retrieval keys for memory blocks for storing file contents. In this example, table (452) is taken to represent all file identifiers and all associated retrieval keys for an entire file system. Exemplary table (452) contains file identifiers and retrieval keys for file F1 with key KJ, file F2 with key KM, and file F3 with key KN, as well as other file identifiers and retrieval keys not shown. In this example, the file identifiers and retrieval keys from table (452) are all written (458) to computer memory (324) through memory management system (152). Memory management system (152) stores the file identifiers and keys as data in memory blocks tracked through block access table (118), returning (460) retrieval keys for the file identifiers and keys, in effect, and this process iterates until all file identifiers and retrieval keys in table (452) are represented by a single retrieval key (153).

Figure 8:
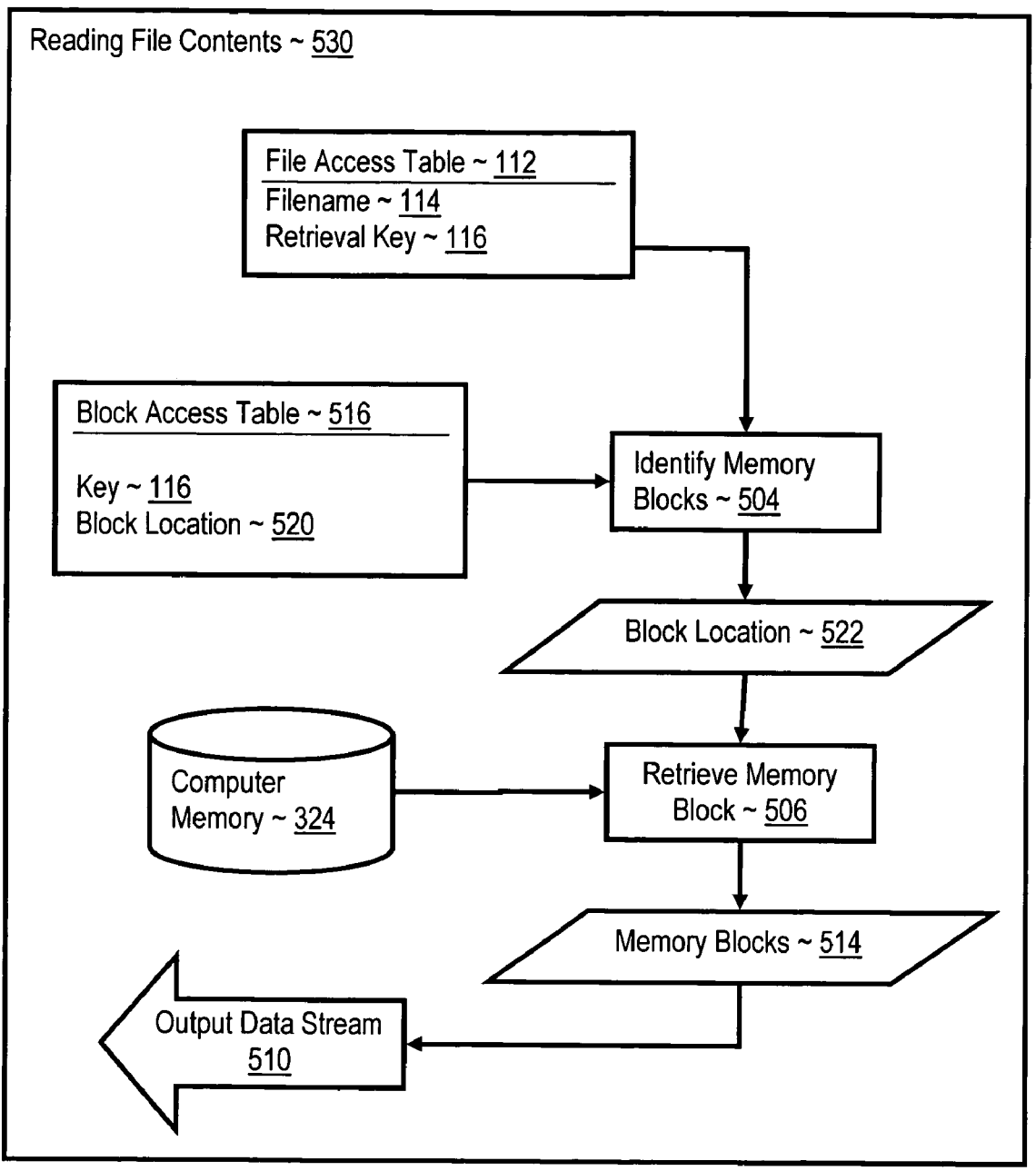
FIG. 8 sets forth a flow chart illustrating an exemplary method of reading data from memory according to embodiments of the present invention.

Methods, systems, and products of transparent content addressable data storage and compression for a file system according to embodiments of the present invention support not only writing data to memory but also usefully support reading data from memory. FIG. 8 sets forth a flow chart illustrating a method of reading file contents from computer memory for a file comprising an identifier (114) and one or more associated retrieval keys (116). The method of FIG. 8 includes identifying (504) memory blocks in dependence upon the associated retrieval keys (116) and retrieving (506) from memory (324) the identified memory blocks (514) for return to a reading memory client. Each identified memory block (514) in this example is a block identified in dependence upon a retrieval key (116). In the example of FIG. 8, a memory management system according to an embodiment of the present invention maintains a table called a block access table (516) that relates retrieval keys (116) to memory block locations (520) in computer memory. In a file system, a memory block location for a memory block having no fixed memory block size, although subject to a maximum memory block size, may be implemented, for example, as storage of disk identification, track number, sector number, beginning byte number (offset within a sector), and block size.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of transparent content addressable data storage and compression for a file system comprising:
    providing a data structure that associates file identifiers and retrieval keys for memory blocks for storing file contents;
    storing in the data structure one or more file identifiers;
    searching at a repeating memory interval through a search section of a chunk for a segment of the chunk that matches a memory block from computer memory, including: calculating a weak checksum for the memory block; calculating rolling weak checksums for segments of the search section of the chunk; comparing the rolling weak checksums for the segments with the checksum for the memory block; and if a segment is found with a rolling weak checksum equal to the weak checksum of the memory block: calculating a strong checksum for the memory block; calculating a strong checksum for the segment with the matching rolling weak checksum; comparing the strong checksum of the memory block and the strong checksum for the segment with the equal rolling weak checksum;
    determining that the search has found a segment having contents that match the contents of the memory block if the strong checksum of the memory block and the strong checksum for the segment with the matching rolling weak checksum are equal;
    if a matching segment is found:
    discarding the matching segment, providing a retrieval key for the memory block as a retrieval key for the matching segment, and storing in the data structure the retrieval key for the matching segment in association with a file identifier; and
    identifying an unmatched portion of the chunk that does not match the memory block, storing the unmatched portion, providing a retrieval key forte unmatched portion, and storing in the data structure the retrieval key for the unmatched portion in association with the file identifier.

2. The method of claim 1 further comprising iteratively storing retrieval keys for each file until each file identifier is associated with only one retrieval key.

3. The method of claim 1 further comprising iteratively storing all file identifiers and associated retrieval keys until an entire file system is represented by a single retrieval key.

4. The method of claim 1 wherein storing the unmatched portion of the chunk comprises storing the unmatched portion of the chunk as a new memory block having a memory block size equal to the size of the unmatched portion of the chunk.

5. The method of claim 1 wherein searching for a segment of the chunk that matches the memory block fails to find a matching segment, the method further comprising repeatedly carrying out the following steps for all memory blocks in computer memory until a matching segment is found:
    retrieving a next memory block from computer memory; and searching for a segment of the chunk that matches the next memory block.

6. The method of claim 5 wherein no matching segment is found in any memory block in computer memory, the method further comprising:
    storing a search section of the chunk;
    providing a retrieval key for the search section of the chunk; and
    storing the retrieval key for the search section in association with a file identifier.

7. The method of claim 1 further comprising reading file contents from computer memory for a file comprising an identifier and one or more associated retrieval keys, including:
    identifying memory blocks in dependence upon the associated retrieval keys; and
    retrieving from memory the identified memory blocks.

8. A system of transparent content addressable data storage and compression for a file system comprising:
    means for providing a data structure that associates file identifiers and retrieval keys for memory blocks for storing file contents;
    means for storing in the data structure one or more file identifiers;
    means for searching at a repeating memory interval through a search section of a chunk for a segment of the chunk that matches a memory block from computer memory, including means for: calculating a weak checksum for the memory block; calculating rolling weak checksums for segments of the search section of the chunk; comparing the rolling weak checksums for the segments with the checksum for the memory black; and if a segment is found with a rolling weak checksum equal to the weak checksum of the memory block: calculating a strong checksum for the memory block; calculating a strong checksum for the segment with the matching rolling weak checksum; comparing the strong checksum of the memory block and the strong checksum for the segment with the equal rolling weak checksum;
    means for determining that the search has found a segment having contents that match the contents of the memory block if the strong checksum of the memory block and the strong checksum for the segment with the matching rolling weak checksum are equal;
    means for discarding a matching segment, means for providing a retrieval key for the memory block as a retrieval key for the matching segment, and means for storing in the data structure the retrieval key for the matching segment in association with a file identifier; and means for identifying an unmatched portion of the chunk that does not match the memory block, means for storing the unmatched portion, means for providing a retrieval key for the unmatched portion, and means for storing in the data structure the retrieval key for the unmatched portion in association with the file identifier.

9. The system of claim 8 further comprising means for iteratively storing retrieval keys for each file until each file identifier is associated with only one retrieval key.

10. The system of claim 9 further comprising means for iteratively storing all file identifiers and associated retrieval keys until an entire file system is represented by a single retrieval key.

11. The system of claim 8 wherein means for storing the unmatched portion of the chunk comprises means for storing the unmatched portion of the chunk as a new memory block having a memory block size equal to the size of the unmatched portion of the chunk.

12. The system of claim 8 further comprising:
means for retrieving a next memory block from computer memory; and
means for searching for a segment of the chunk that matches the next memory block.

13. The system of claim 12 further comprising:
means for storing a search section of the chunk;
means for providing a retrieval key for the search section of the chunk; and
means for storing the retrieval key for the search section in association with a file identifier.

14. The system of claim 8 further comprising means for reading file contents from computer memory for a file comprising an identifier and one or more associated retrieval keys, including:
means for identifying memory blocks in dependence upon the associated retrieval keys; and
means for retrieving from memory the identified memory blocks.

15. A computer program product of transparent content addressable data storage and compression for a file computer program product comprising:
a recording medium;
means, recorded on the recording medium, for providing a data structure tat associates file identifiers and retrieval keys for memory blocks for storing file contents;
means, recorded on the recording medium, for storing in the data structure one or more file identifiers;
means, recorded on the recording medium, far searching at a repeating memory interval through a search section of a chunk for a segment of the chunk that matches a memory block from computer memory, including means, recorded on the recording medium, for: calculating a weak checksum for the memory block; calculating rolling weak checksums for segments of the search section of the chunk; comparing the rolling weak checksums for the segments with the checksum for the memory block; and if a segment is found with a rolling weak checksum equal to the weak checksum of the memory block: calculating a strong checksum for the memory block; calculating a strong checksum for the segment with the matching rolling weak checksum; comparing the strong checksum of the memory block and the strong checksum for the segment with the equal rolling weak checksum;

means, recorded on the recording medium, for determining that the search has found a segment having contents that match the contents of the memory block if the strong checksum of the memory block and the strong checksum for the segment with the matching rolling weak checksum are equal;

means, recorded on the recording medium, for discarding a matching segment, means, recorded on the recording medium, for providing a retrieval key for the memory block as a retrieval key for the matching segment, and means, recorded on the recording medium, for storing in the data structure the retrieval key for the matching segment in association with a file identifier; and means, recorded on the recording medium, for identifying an unmatched portion of the chunk that does not match the memory block, means, recorded on the recording medium, for storing the unmatched portion, means, recorded on the recording medium, for providing a retrieval key for the unmatched portion, and means, recorded on the recording medium, for storing in the data structure the retrieval key for the unmatched portion in association with the file identifier.

16. The computer program product of claim 15 further comprising means, recorded on the recording medium, for iteratively storing retrieval keys for each file until each file identifier is associated wit only one retrieval key.

17. The computer program product of claim 16 further comprising means, recorded on the recording medium, for iteratively storing all file identifiers and associated retrieval keys until an entire file computer program product is represented by a single retrieval key.

18. The computer program product of claim 15 wherein means, recorded on the recording medium, for storing the unmatched portion of the chunk comprises means, recorded on the recording medium, for storing the unmatched portion of the chunk as a new memory block having a memory block size equal to the size of the unmatched portion of the chunk.

19. The computer program product of claim 15 further comprising:
means, recorded on the recording medium, for retrieving a next memory block from computer memory; and
means, recorded on the recording medium, for searching for a segment of the chunk that matches the next memory block.

20. The computer program product of claim 19 further comprising:
means, recorded on the recording medium, for storing a search section of the chunk;
means, recorded on the recording medium, for providing a retrieval key for the search section of the chunk; and
means, recorded on the recording medium, for storing the retrieval key for the search section in association with a file identifier.

21. The computer program product of claim 15 further comprising means, recorded on the recording medium, for reading file contents from computer memory for a file comprising an identifier and one or more associated retrieval keys, including:
means, recorded on the recording medium, for identifying memory blocks in dependence upon the associated retrieval keys; and
means, recorded on the recording medium, for retrieving from memory the identified memory blocks.

* * * * *